United States Patent [19]

Rubinstein

[11] Patent Number: 5,513,205
[45] Date of Patent: Apr. 30, 1996

[54] END-PUMPING LASER CONFIGURATION UTILIZING A RETROREFLECTOR AS AN INPUT COUPLER

[75] Inventor: Boaz Rubinstein, Maccabim, Israel

[73] Assignee: B.C.C. Ltd., Maccabim, Israel

[21] Appl. No.: 381,577

[22] Filed: Jan. 31, 1995

[51] Int. Cl.⁶ .................................................. H01S 3/08
[52] U.S. Cl. ........................... 372/99; 372/92; 372/71
[58] Field of Search ............................... 372/98, 99, 92, 372/94, 71, 100, 95, 105, 107, 108

[56] References Cited

U.S. PATENT DOCUMENTS

| | | | |
|---|---|---|---|
| 4,461,009 | 7/1984 | Lundstrom | 372/105 |
| 4,977,562 | 12/1990 | Welch et al. | 372/98 |
| 5,121,404 | 6/1992 | Aoshima et al. | 372/94 |
| 5,276,694 | 1/1994 | Wolf et al. | 372/100 |
| 5,289,493 | 2/1994 | Fink | 372/100 |

*Primary Examiner*—Leon Scott, Jr.
*Attorney, Agent, or Firm*—Mark M. Friedman

[57] ABSTRACT

An end-pumping laser system, which includes a resonator and a single pumping radiation source. The resonator includes an input coupler, a lasing medium and an output coupler. The single pumping radiation source pumps radiation axially into the resonator. The input coupler of the resonator is a retroreflector having three orthogonal surfaces which is located coaxially with, and intermediate between, the resonator and the pumping radiation source. The retroreflector is oriented so that radiation from the pumping radiation source simultaneously impinges on the three orthogonal surfaces of the retroreflector.

4 Claims, 2 Drawing Sheets

END-PUMPING LASER CONFIGURATION UTILIZING A RETROREFLECTOR AS AN INPUT COUPLER

FIELD AND BACKGROUND OF THE INVENTION

The present invention relates to a lasers and, more particularly, to end-pumping laser configurations.

Lasers all include three key components: (1) a pump or energy source; (2) a gain or laser medium; and (3) an optical cavity or resonator.

Two basic types of laser pumping are commonly used. In transverse pumping, or side pumping, the pumping radiation is introduced into the resonator substantially from the side while in longitudinal pumping, or end-pumping, the pumping radiation is introduced into the optical resonator substantially axially.

End (longitudinal) pumping of a laser is a well known method for generating high power high quality laser beam.

Transverse laser pumping suffers from a number of disadvantages. Transverse laser pumping could lead to an uneven spatial excitation of the lasing medium. The lack of uniformity takes place in the direction of the path of the pumping beam because of absorption, and along the axis of propagation, which is orthogonal to the pumping beam, because of the inherent pumping beam profile of the pumping source. Focusing the entire pumping laser energy onto a central spot in the optical cavity may lead to optical damage of the cavity and could leave a significant fraction of the lasing medium unexcited. See, for example, F. J. Duarte and Lloyd W. Hillman, "Dye Laser Principles", Academic Press Inc., 1990, pp 252–253, which also provides references of end-pumping developments.

Conventional end-pumping lasers also suffer from a number of disadvantages. The laser cavity, or optical resonator, typically includes an expensive dichroic mirror which has high transmission to a specific pumping wavelength and high reflectivity to a specific lasing wavelength so that conventional pumping is less commercially attractive for tunable laser where the wavelength of the laser beams is varied. In addition, the dichroic mirror and other laser components must be aligned with great precision which further adds to the cost of the laser. A further difficulty with conventional end-pumping lasers is that because of the axial alignment part of the pumping beam is reflected backward and could reach and damage the pumping source while another part of the pumping beam could exit the optical cavity along with the generated laser beam.

There is thus a widely recognized need for, and it would be highly advantageous to have, a simple and highly versatile end-pumping laser configuration which would use relatively inexpensive components, would not require extensive and highly precise alignment and would largely confine the pumping beam to the resonator, for a large variety of pumping and lasing beam wavelengths.

SUMMARY OF THE INVENTION

According to the present invention there is provided an end-pumping laser system, comprising: (a) a resonator, the resonator including: (i) an input coupler; (ii) a lasing medium for generating laser radiation; and (iii) an output coupler for allowing a portion of the produced laser beam to leave the resonator; and (b) a single pumping radiation source for pumping radiation substantially axially into the resonator for generating a produced laser beam; the resonator being characterized in that the input coupler is a retroreflector having three substantially orthogonal surfaces, the retroreflector being located substantially coaxially with, and intermediate between, the resonator and the pumping radiation source, the retroreflector being oriented so that radiation from the pumping radiation source simultaneously impinges on the three substantially orthogonal surfaces of the retroreflector.

According to further features in preferred embodiments of the invention described below, the system further includes suitable optics located between the pumping radiation source and the corner cube.

The present invention successfully addresses the shortcomings of the presently known configurations by providing an end-pumping laser system which is simple and which can accommodate a wide range of pumping and generated beam frequencies. A system according to the present invention uses an inexpensive and, typically, uncoated, corner cube (hereinafter referred to as a "retroreflector") as the input coupler. The system is largely self-aligning, obviating the need for extensive and highly precise alignment. Furthermore, the system prevents the pumping beam from returning to the pumping beam source, thereby reducing the chance for damage of the pumping source.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an end-pumping laser configuration which uses a retroreflector as an input coupler.

The principles and operation of a laser configuration according to the present invention may be better understood with reference to the drawings and the accompanying description.

Figure 1:
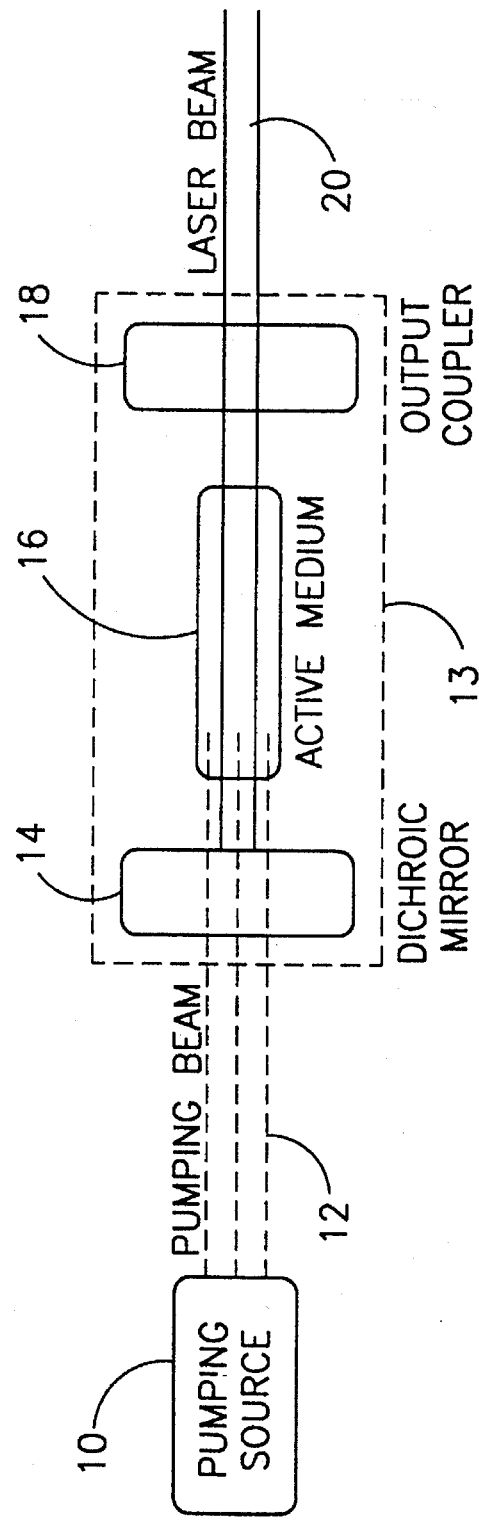
FIG. 1 schematically depicts a conventional end-pumping laser configuration.

Referring now to the drawings, FIG. 1 illustrates a conventional end-pumping system. A pumping radiation source 10, such as a flashlamp or a suitable laser, is used to supply a pumping radiation beam 12 to the laser cavity, or optical resonator, 13 (hereinafter refereed to as "resonator").

Typically, pumping beam 12 is generated by a pumping laser. For example, a diode laser lasing at a wavelength of 808 nm may be used to end-pump a Nd:YAG active medium which generates laser radiation at 1064 nm, or a nitrogen laser may be used for end-pumping a dye laser, and the like.

Pumping beam 12 may alternatively be generated by a flashlamp.

Resonator 13 of a conventional end-pumping laser system includes an input coupler in the form of a dichroic mirror 14 which is designed, through the use of special surface coatings, to allow high transmission of pumping beam 12 but high reflectivity to the lasing radiation generated in the active, or lasing, medium 16. Resonator 13 further includes an active lasing medium 16 in which the laser radiation is generated and an output coupler 18 which is designed to allow a certain portion of the generated lasing radiation to exit the system as a coherent output laser beam 20.

In operation, pumping beam 12, generated by pumping source 10, enters the end-pumping laser resonator 13 through dichroic mirror 14 and excites active lasing medium 16. Dichroic mirror 14 transmits the pumping laser wavelength and reflects the generated laser beam inside resonator 13. The excited active lasing medium 16 generates laser light by oscillations of the radiation between output coupler 18 and dichroic mirror 14 which are accurately aligned with each other.

A conventional end-pumping laser system such as the one described above with reference to FIG. 1 suffers from a number of disadvantages.

First, because of the alignment of pumping beam 12 and dichroic mirror 14, a portion of pumping beam 12 is reflected backward from dichroic mirror 14 into pumping source 10, which could lead to damage of pumping source 10.

Second, because of the alignment of pumping beam 12, dichroic mirror 14 and output coupler 18, a portion of pumping beam 12 may be able to escape resonator 13 through output coupler 18, thereby degrading the quality of the output laser beam 20.

Third, conventional coatings of dichroic mirror 14 are typically adversely affected by high power laser radiation so that special coatings must be used to ensure that the system is sufficiently rugged to withstand the full power of pumping source 10.

Finally, the coatings on dichroic mirror 14 are designed to be effective for specific and relative narrow bandwidths. The effective bandwidths are narrower for higher power lasers. Furthermore, each dichroic mirror 14 is designed for a specific set of pumping source and active medium so that it is not readily possible, using the same laser system, to use different pumping sources and/or to generate laser beams of different wavelengths. Thus, for example, a conventional end-pumping laser system can be made to be tunable over a wide range of wavelengths only by providing a variety of replaceable dichroic mirrors. However, providing such a set of such mirrors is prohibitively expensive and the replacement of mirrors in the laser system requires highly precise alignment which is very time consuming.

To overcome all the above limitations of conventional end-pumping laser systems, it is proposed to replace the dichroic mirror of a conventional end-pumping system, such as that depicted in FIG. 1, with a retroreflector.

A retroreflector is well known in optics and can be envisioned as a prism made by cutting off one corner of a cube. The cut off corner includes three mutually perpendicular reflecting surfaces, making the retroreflector retro-directive in both meridians. The retroreflector will thus return all the radiation rays back toward their source, provided the radiation strikes the retroreflector at an angle which is at or above the angle of total internal reflection.

Retroreflectors have been used in at least two laser applications, but in completely different contexts than that proposed in the present invention.

First, U.S. Pat. No. 5,251,221 discloses a self-aligning intracavity Raman laser which utilizes a retroreflector as one of the cavity mirrors. The lasers described U.S. Pat. No. 5,251,221 are insensitive to misalignment and have acceptable beam divergence. However, the pumping scheme is side, or traverse, pumping and no pumping radiation goes through the three mutually perpendicular reflecting surfaces. The pumping source radiates pump energy at a first wavelength (1.06 μm) and the Raman resonator radiates laser energy at a second, and quite different, wavelength (1.54 μm).

Second, U.S. Pat. No. 5,121,404 discloses an optically pumped solid laser. The lasing medium is a cylinder having one end portion in the form of a corner cube prism. The end face of the corner cube includes at least one coating on at least a part of the end face. In several embodiments, it is disclosed that additional pumping can be effected through three additional pumping sources, each of which pumps radiation into one of the three mutually perpendicular reflecting surfaces of the corner cube.

Figure 2:
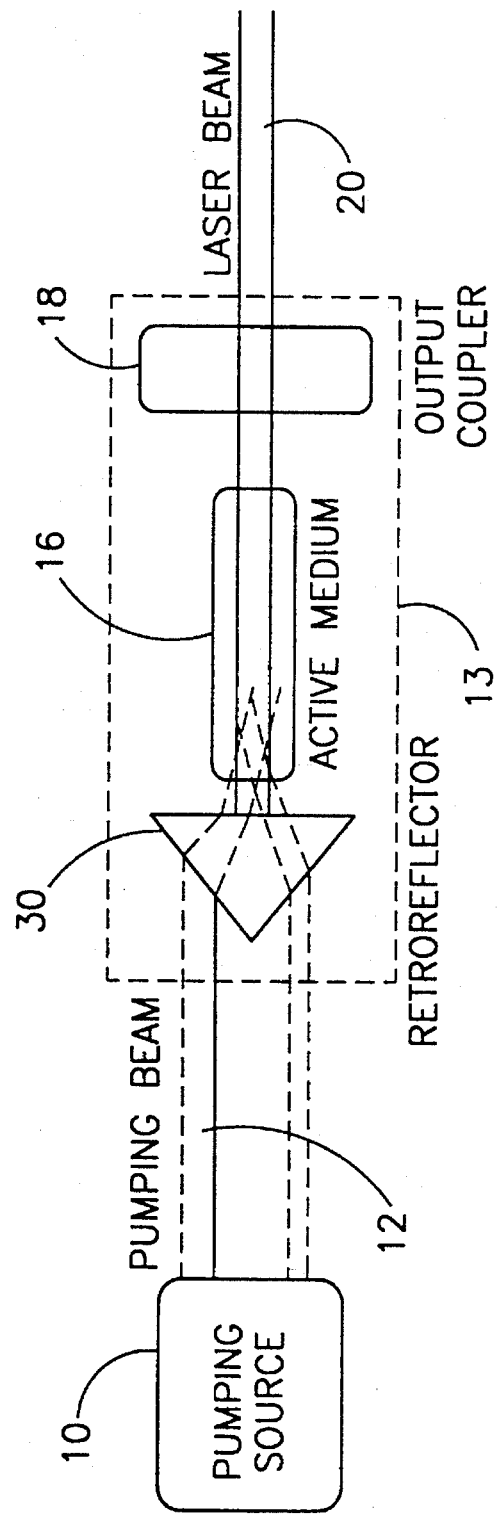
FIG. 2 schematically depicts an end-pumping laser system according to the present invention.

FIG. 2 schematically depicts the construction of an end-pumping laser system according to the present invention. As with the conventional end-pumping system of FIG. 1, a system according to the present invention includes a single pumping source 10, such as a suitable laser or flashlamp, which generates a pumping beam 12. Pumping radiation source 10 pumps radiation substantially axially into resonator 13 containing active medium 16 for the purpose of generating a produced laser beam.

Figure 3:
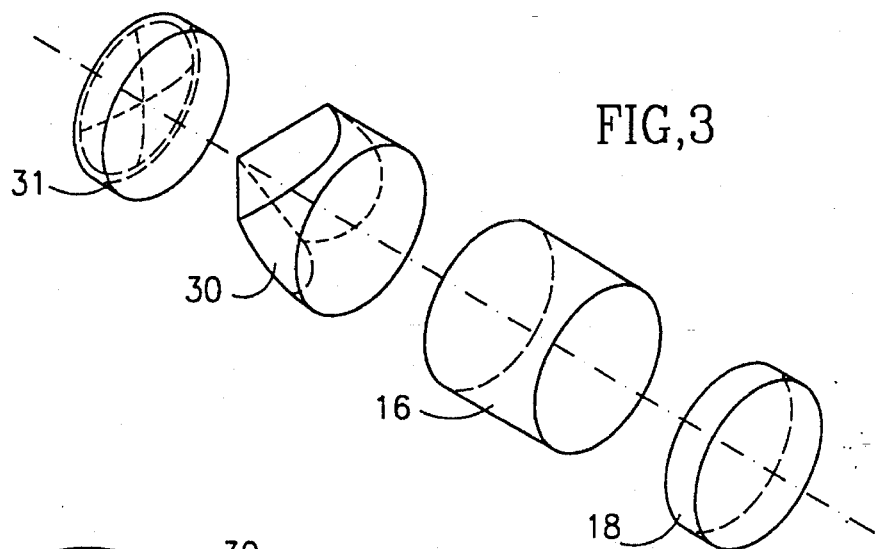
FIG. 3 depicts in perspective view an end-pumping laser system according to the present invention, including the retroreflector, lasing medium, output coupler and further including optics.
Figure 4:
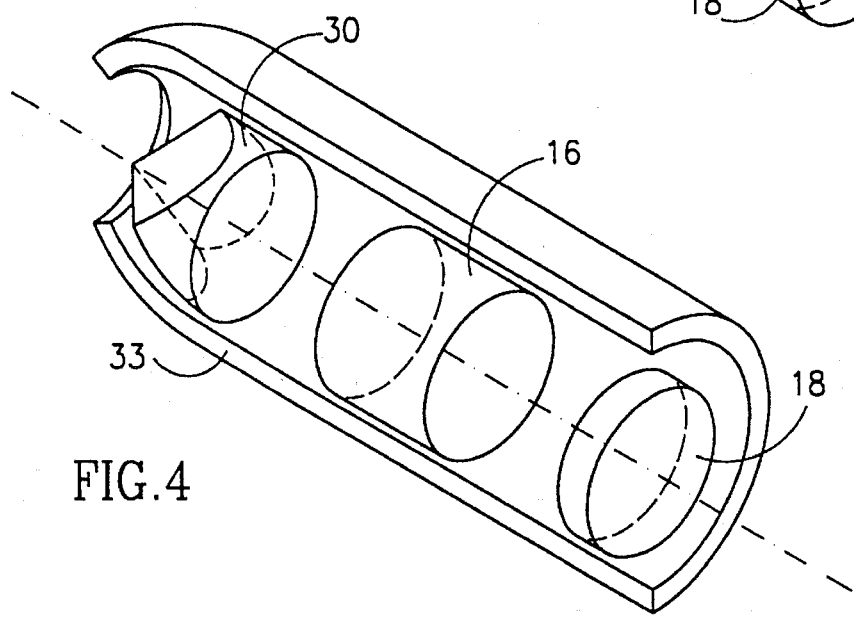
FIG. 4 depicts in perspective view an end-pumping laser system according to the present invention including the retroreflector, lasing medium, output coupler and further including a reflector/absorber.

Pumping beam 12 enters resonator 13 through a retroreflector 30. Coupling optics 31 (FIG. 3) may be used between pumping source 10 and retroreflector 30 in order to tune the shape of pumping beam 12 for optimal conversion efficiency and high beam quality. It is also possible to add further features to the system, including, but not limited to, various reflectors and/or absorbers 33 (FIG. 4) to reflect and/or absorb stray radiation.

Resonator 13 of a system according to the present invention includes retroreflector 30, which serves as the input coupler, and further includes active lasing medium 16 and output coupler 18.

Retroreflector 30 is located substantially coaxially with, and between, resonator 13 and pumping radiation source 10. Retroreflector 30 has three substantially orthogonal surfaces (see FIGS. 3 and 4 for a perspective depiction of retroreflector 30) and is oriented so that pumping radiation 12 from single pumping source 10 simultaneously impinges on all three substantially orthogonal surfaces of retroreflector 30.

Resonator 13 further includes an output coupler 18, typically a partially reflective mirror, which allows a portion of the generated laser beam to leave the system as a coherent laser beam 20.

Figure 5:
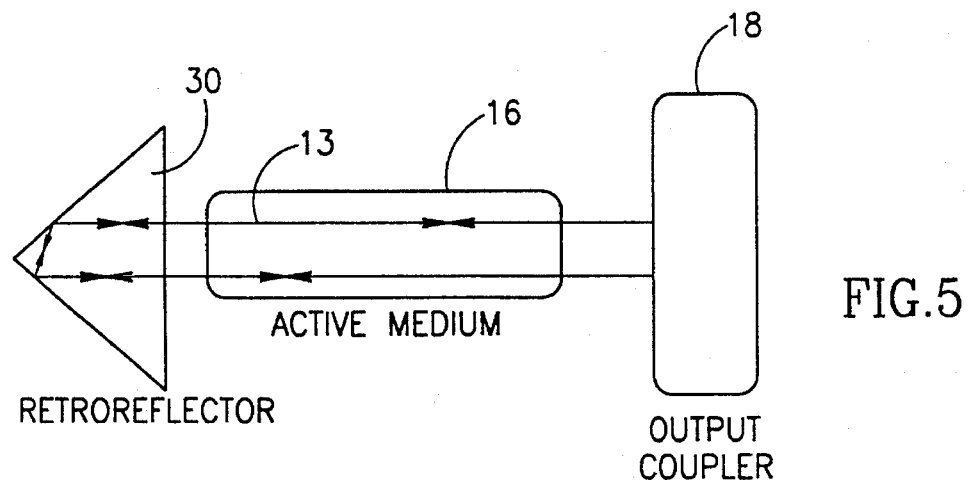
FIG. 5 schematically depicts the resonator of an end-pumping laser system according to the present invention showing the path of a ray of radiation inside the resonator.

Retroreflector 30 is characterized in that any radiation ray entering its end face will be totally internally reflected and will emerge from the end face parallel to itself, but with the opposite direction of propagation. This property is, within acceptable angle ranges, independent of the precise orientation of the retroreflector. Thus, the alignment of the system is rendered very simple, significantly enhancing the stability and ruggedness of the system. FIG. 5 schematically depicts the path of a typical radiation beam 17 within resonator 13. Beam 17 is internally reflected within retroreflector 30 and leaves retroreflector 30 along a path which is parallel to its path of approach. Beam 17 then passes through active lasing medium 16 and is reflected back from the face of output coupler 18.

A retroreflector can achieve total internal reflection without the use of any complicated and costly multilayer surface coatings which are designed for specific, rather narrow, bandwidths. Thus, a single retroreflector can be used in systems handling a variety of pumping and generated radiation wavelengths, thereby dramatically enhancing its versatility and lowering the system's capital and operating costs.

While the invention has been described with respect to a limited number of embodiments, it will be appreciated that many variations, modifications and other applications of the invention may be made.

What is claimed is:

1. An end-pumping laser system, comprising:
    (a) a resonator, said resonator including:
       (i) an input coupler;
       (ii) a lasing medium for generating laser radiation; and
       (iii) an output coupler for allowing a portion of said produced laser beam to leave said resonator; and
    (b) a single pumping radiation source for pumping radiation substantially axially into said resonator for generating a produced laser beam;

said resonator being characterized in that said input coupler is a retroreflector having three substantially orthogonal surfaces, said retroreflector being located substantially coaxially with, and intermediate between, said resonator and said pumping radiation source, said retroreflector being oriented so that radiation from said pumping radiation source simultaneously impinges on said three substantially orthogonal surfaces of said retroreflector.

2. A system as in claim 1, further comprising optics located between said pumping radiation source and said retroreflector.

3. A system as in claim 1, wherein said pumping radiation source is a laser.

4. A system as in claim 1, wherein said pumping radiation source is a flashlamp.

* * * * *